United States Patent
Su

(10) Patent No.: US 6,499,391 B1
(45) Date of Patent: Dec. 31, 2002

(54) STRUCTURE OF A ROASTING DEVICE

(76) Inventor: Yung-Sen Su, PO Box 82-144, Taipei (TW)

( * ) Notice: Subject to any disclaimer, the term of this patent is extended or adjusted under 35 U.S.C. 154(b) by 0 days.

(21) Appl. No.: 10/167,970

(22) Filed: Jun. 13, 2002

(30) Foreign Application Priority Data

Jan. 31, 2002 (TW) ........................................ 91201053 U

(51) Int. Cl.⁷ ............................ A23L 1/00; A47J 27/00; A47J 37/00
(52) U.S. Cl. ............................ 99/341; 99/339; 99/355; 99/357; 99/348; 99/483
(58) Field of Search .................... 99/325–334, 339–341, 99/352–355, 342, 357, 348, 443 C, 443 R, 486; 426/231–233, 523; 219/400, 401, 413, 490, 491, 494

(56) References Cited

U.S. PATENT DOCUMENTS

| | | | | |
|---|---|---|---|---|
| 3,827,345 A | * | 8/1974 | Willson | 99/325 |
| 3,884,135 A | * | 5/1975 | Lohr et al. | 99/348 |
| 3,945,309 A | * | 3/1976 | Moran | 99/348 X |
| 3,986,443 A | * | 10/1976 | Shimizu | 99/334 |
| 4,173,925 A | * | 11/1979 | Leon | 99/348 |
| 4,195,558 A | * | 4/1980 | Speakman | 99/325 |
| 4,289,064 A | * | 9/1981 | Rosenblatt | 99/334 |
| 4,301,717 A | * | 11/1981 | Knees | 99/348 |
| 4,304,177 A | * | 12/1981 | Koether | 99/348 X |
| 4,331,068 A | * | 5/1982 | Asami | 99/325 X |
| 4,437,159 A | * | 3/1984 | Waugh | 99/327 X |
| 4,503,502 A | * | 3/1985 | Chapin | 99/348 X |
| 6,234,065 B1 | * | 5/2001 | Su | 99/341 |

* cited by examiner

Primary Examiner—Timothy F. Simone
(74) Attorney, Agent, or Firm—Leong C. Lei

(57) ABSTRACT

An improved structure of a roasting device is disclosed. The roasting device comprises a body, a bean-roasting chamber, a bean-entering cover, a front frame board, front cover, connecting elements, a rear cover, fan, filter, fan seat, controller, cooling device, and control panel. The roasting device allows the exhausted gas within the chamber to be forced out and the oil fume and particles are filtered. This will improve environmental pollution and the quality of the roasted bean is improved. The roasted beans are prevented from being squeezed out from the chamber and the speed of cooling of the roasted beans is increased.

7 Claims, 7 Drawing Sheets

STRUCTURE OF A ROASTING DEVICE

BACKGROUND OF THE INVENTION (a) Field of the Invention

The present invention relates to a roasting device, and in particular, to a roasting device comprising a body, a bean-roasting chamber, a bean-entering cover, a front frame board, a front cover, connecting members, rear cover, fan, control panel, cooling device.

(b) Description of the Prior Art

Referring to FIGS. 1 and 2, there is shown a conventional roasting device comprising a body having a bean-roasting chamber 11 with a front cover 2. A fixed filtering board 3 and a bean-entering cover 4 are also provided to the chamber 11. The lower section of the chamber 11 is provided with manual control switch 6 and indicator 7. The lower section of the chamber 11 is also provided with a collecting tray 1000 for collecting residue in the course of bean roasting. The bottom section of the collecting tray 1000 is provided with a fan 100 for quench the roasted bean 8. A cooling device 15 with a cooling tray 10 provided at the cooling rod 101 is provided to the recessed region 12 of the body 1. The central of the recessed region 12 is provided with a motor 13 such that the axle 131 protruded out of the recessed region. There are drawbacks with respect to the conventional roasting device structure.

For instance, the front cover 2 cannot be rapidly removed or opened and the chamber 11 therefore cannot be cleaned effectively. Secondly the oil fume cannot be reduced and the fume will cause pollution. In other words the conventional roasting device does not provide with an effective filtering apparatus to filter polluted flume. Thirdly, the cooling tray 10 is not secured between the tray 14 and the recessed region 12 and therefore the rotating of the axle 131 will drive the tray 14 and the cooling tray 10. This will cause the cooling rod 101 to be ineffective and the roasted bean 8 cannot be stirred. In other words the cooling rod 101 can only be rotated but cannot stir the roasted bean 8. The cooling effect is not significant. Accordingly it is an object of the present invention to provide an improved structure of a roasting device, which mitigates the above drawbacks.

SUMMARY OF THE INVENTION

Accordingly, it is an object of the present invention to provide a structure of a roasting device, wherein the bean-roasting chamber can be quickly cleaned and the exhausted gas within the chamber can be forced out and the oil fume particles can be filtered. Thus, the environment pollution is minimized, and the quality of bean roasting can be improved.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
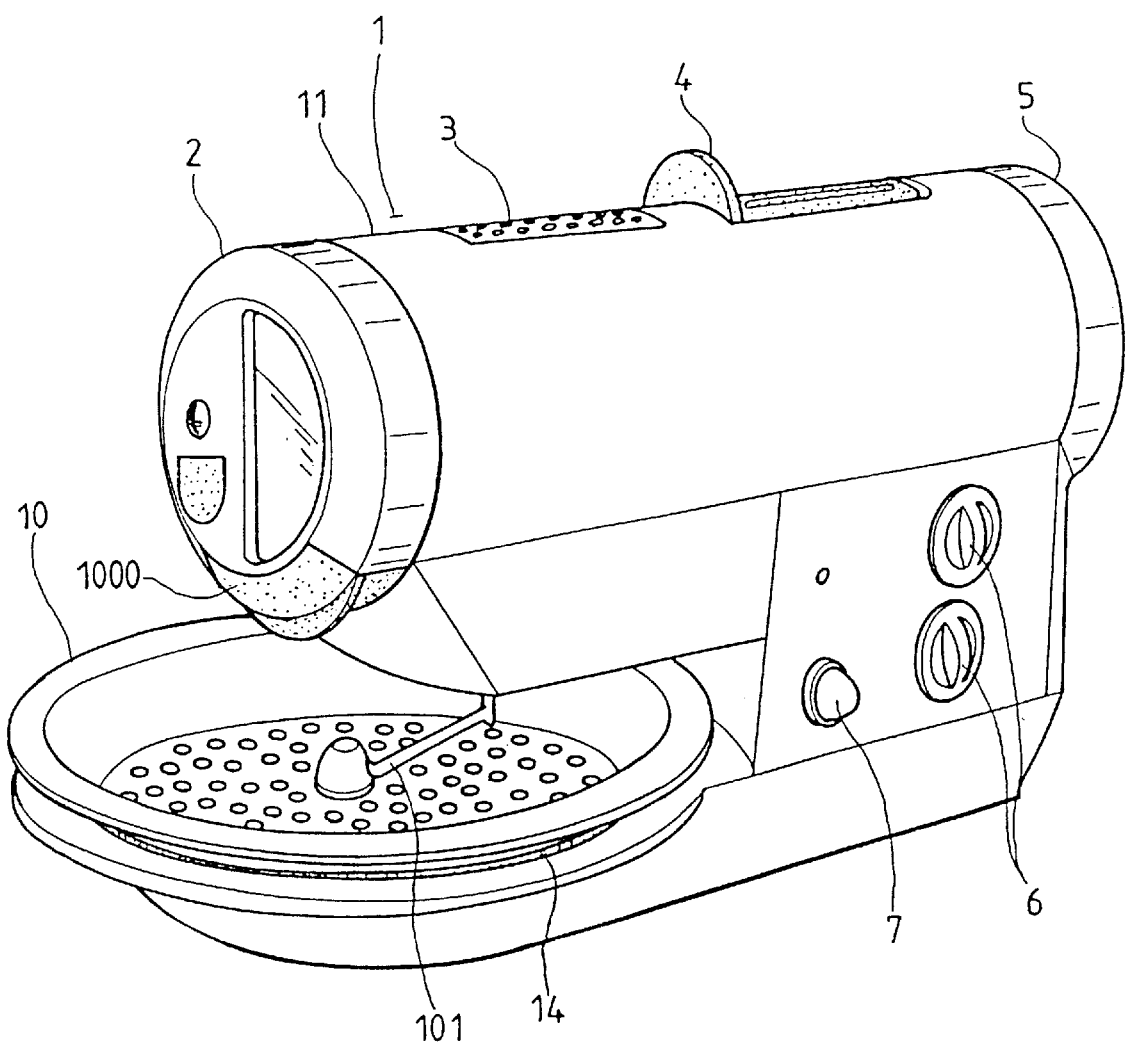
FIG. 1 is a perspective view of a conventional roasting device.
Figure 2:
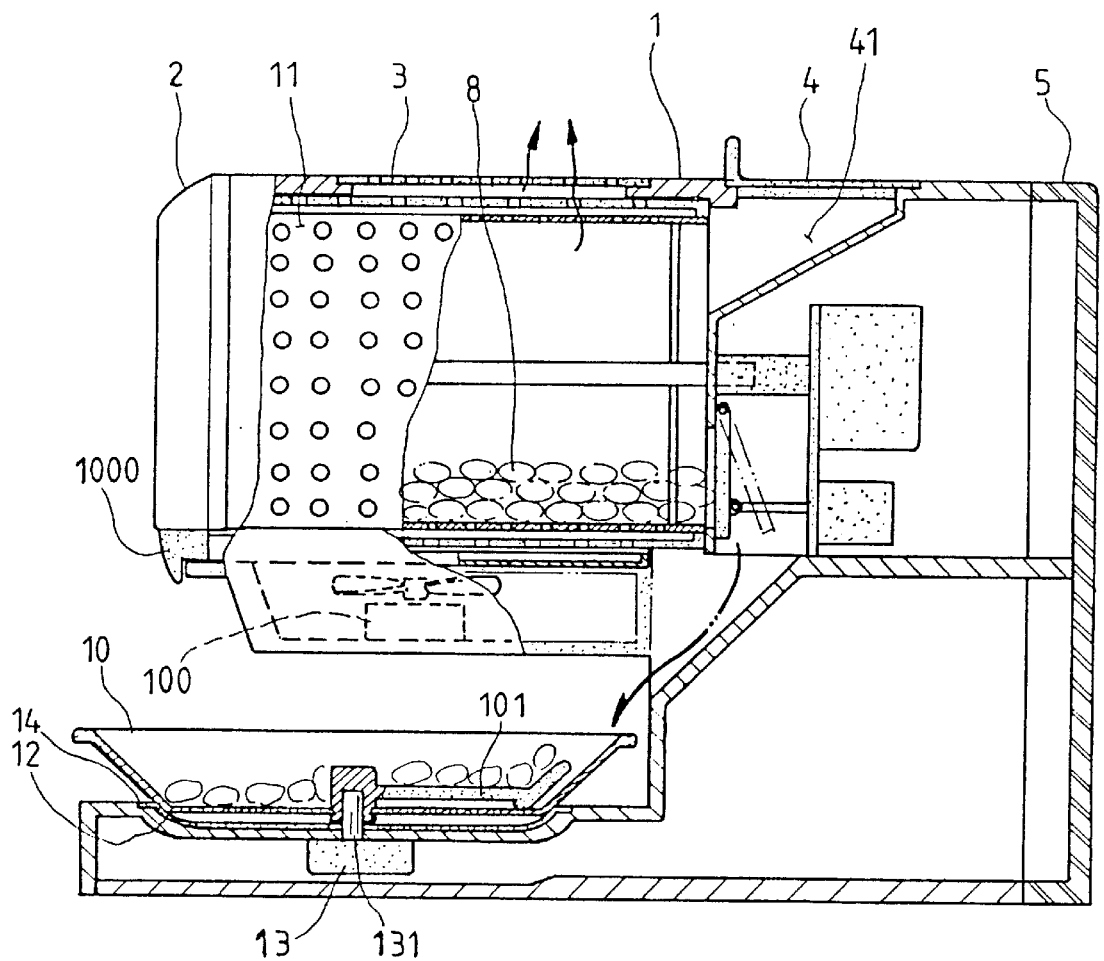
FIG. 2 is a sectional view of the conventional roasting device.
Figure 3:
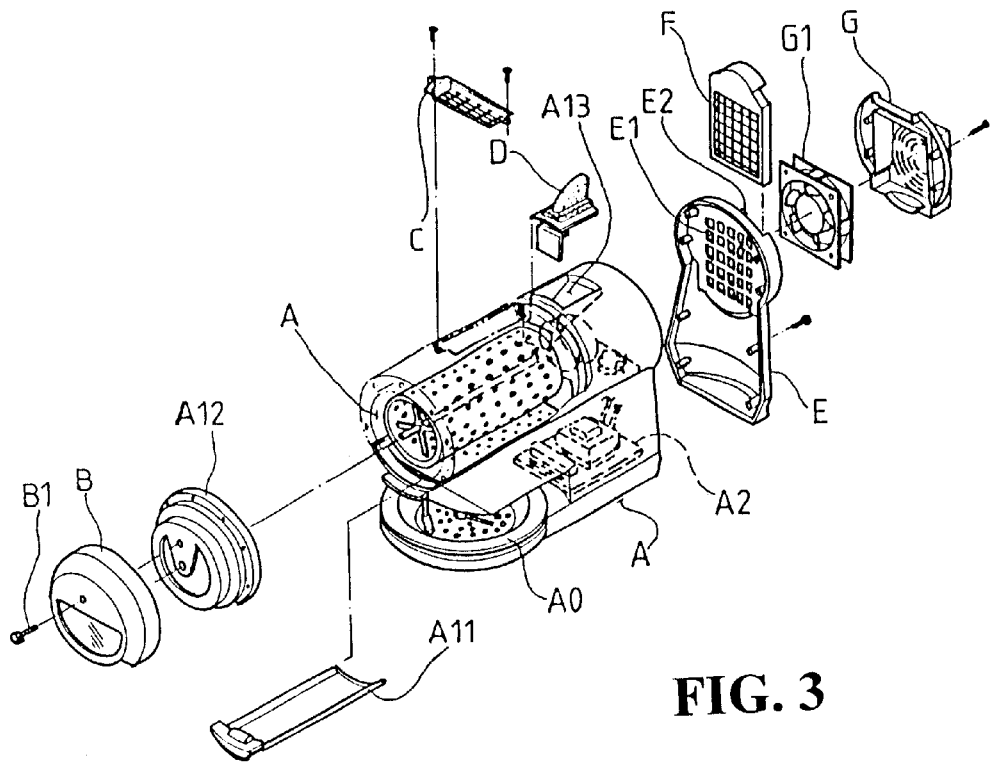
FIG. 3 is a perspective view of the roasting device in accordance with the present invention.
Figure 4:
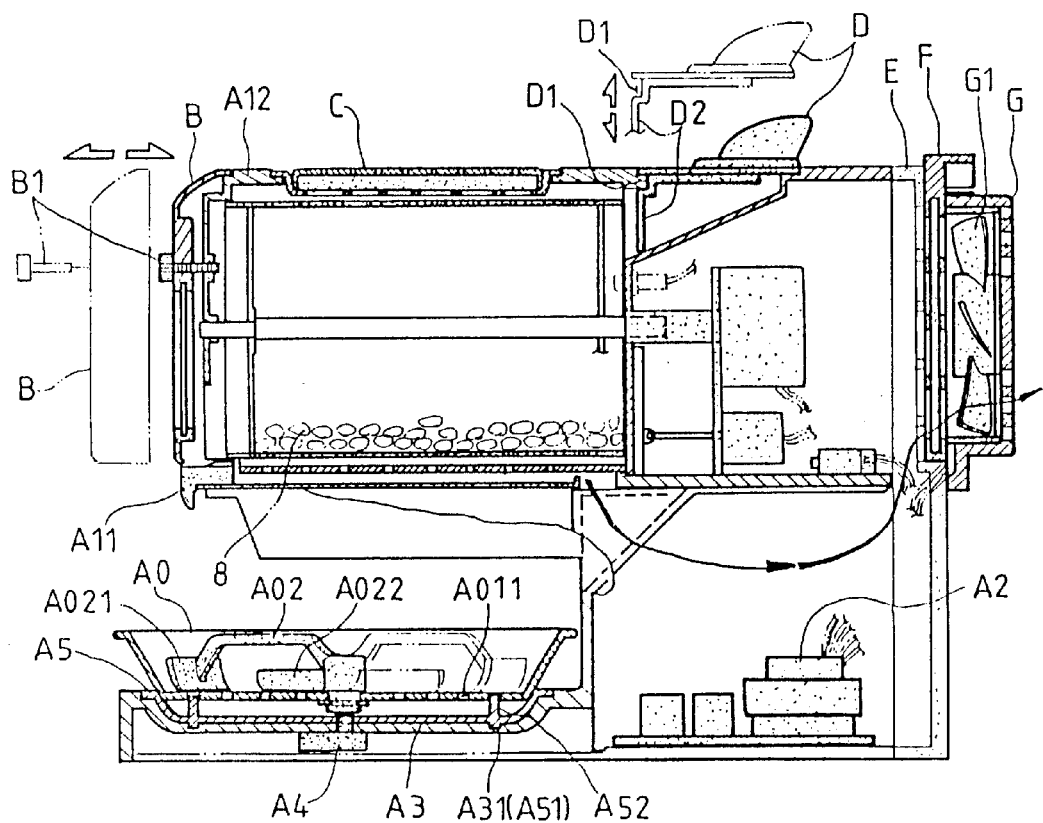
FIG. 4 is a perspective exploded view of the roasting device in accordance with the present invention.
Figure 5:
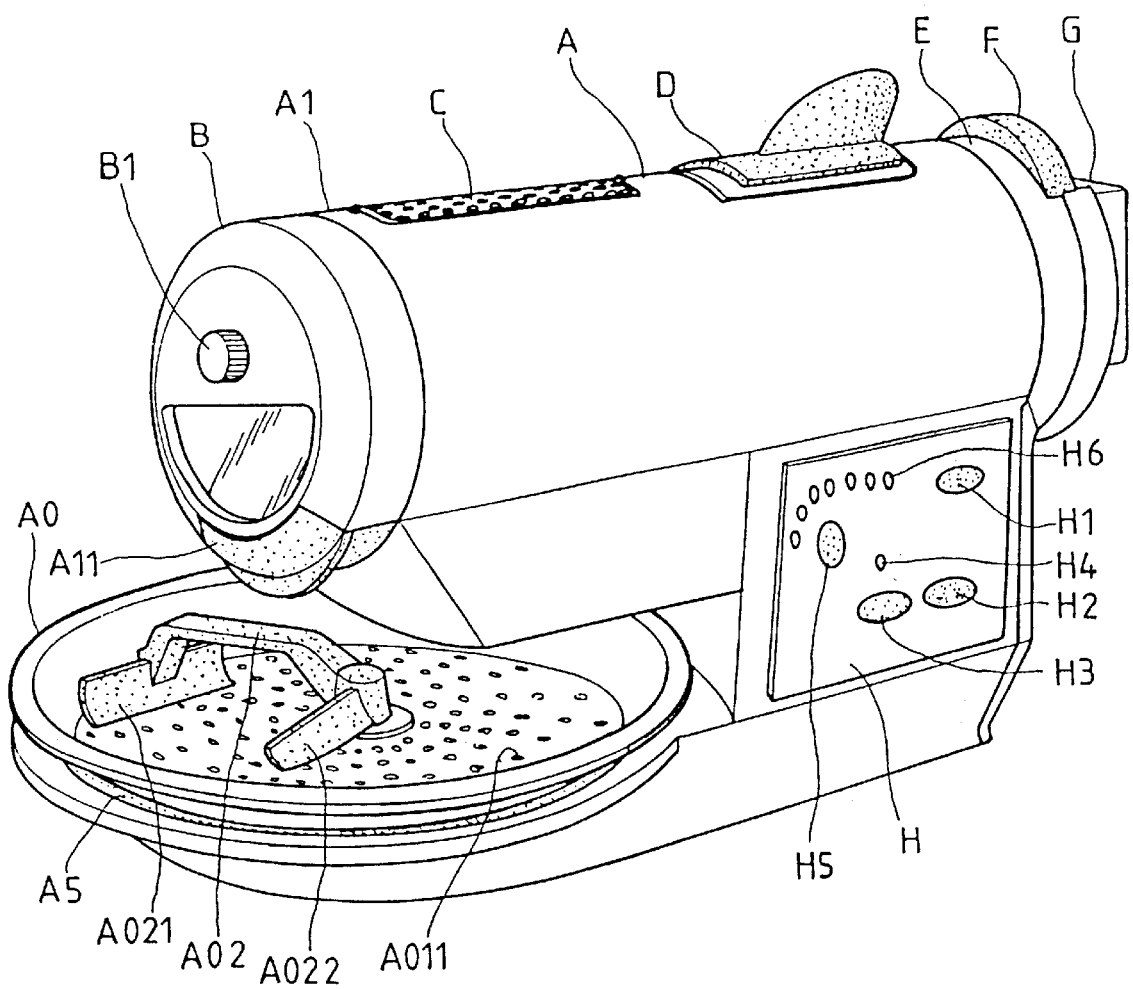
FIG. 5 is a sectional view of the combined portion of the roasting device in accordance with the present invention.
Figure 6:
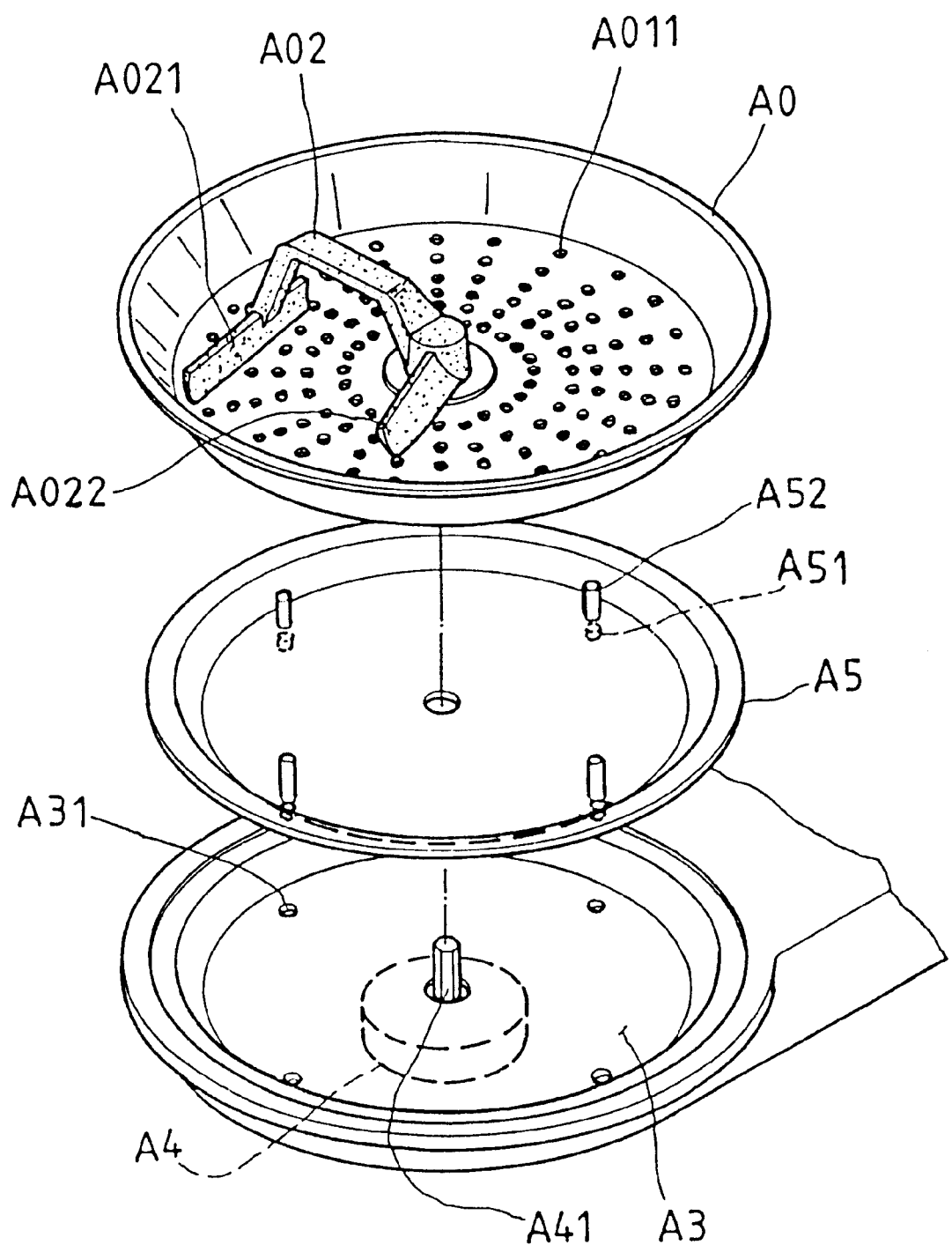
FIG. 6 is a perspective exploded view of the cooling device of the roasting device of the present invention.
Figure 7:
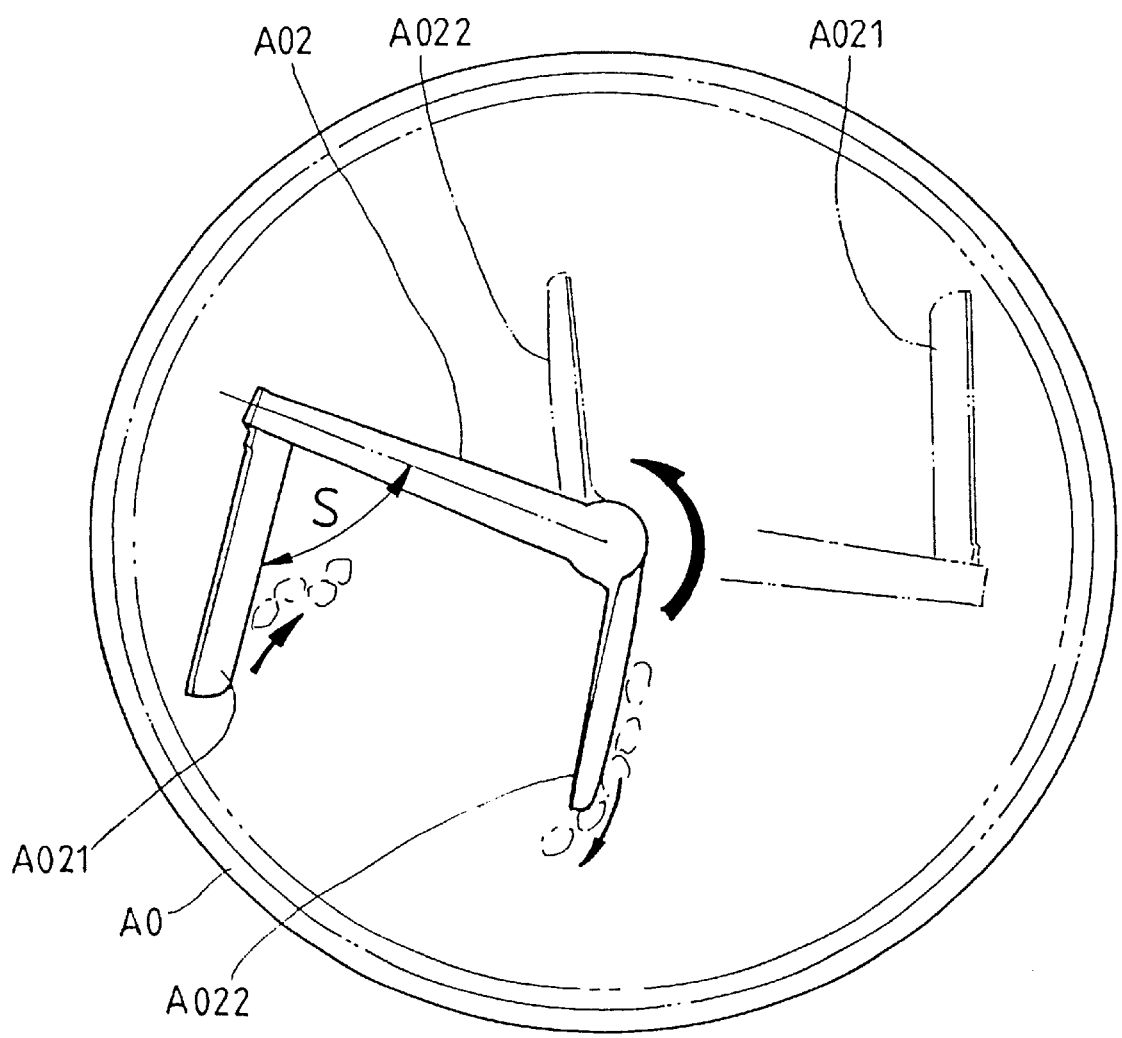
FIG. 7 is the schematic view of the cooling of the roasted beans.

Referring to FIGS. 3, 4 and 5, there is shown an improved structure of a roasting device comprising a body A, a bean-roasting chamber A1, a bean-entering cover D, a front frame board A12, a front cover B, connecting element B1, rear cover E, fan G1, filter F, fan seat G, controller A2, cooling device A00, control panel H. The bean-roasting chamber A1 of the body A is provided with electrical heating tube and rotating shaft. The front section is provided with the front frame board A12, and the front of the front frame board A12 is provided with a front cover B. The two elements can be dismantled or detached from each other. In combination, fingers of the user can hold and rotate the connecting member B1. Thus, it provides a rapid clearing to the interior of the bean-roasting chamber, and the residue in the process of roasting will not be formed. The roasted bean 8 in the chamber A1 will not produce dense smoke while roasting. The moveable air filtering board C at the top section of the body A is provided with a filtering cotton C1. The rear section of the roasting chamber A1 is mounted in sequence with a rear cover E with net holes E1, the rear section of the rear cover E being mounted with the fan G1 to force out the exhausted gas during roasting from the bean-roasting chamber A1. The rear section of the rear cover E is provided with a fan seat G and a notch E2 is formed in between. The notch E2 provides a convenient way of replacement of filter F. When the fan G1 rotates, the exhausted gas is withdrawn from the bean-roasting chamber A1, and the filter F filters the oil frame and particles (the direction being shown in FIG. 4). The top section of the roasting chamber A1 is provided with a bean-entering opening A13 and a bean-entering cover D is used to close or open the opening. To avoid the roasted bean 8 from ejected out or squeeze out from the chamber, one corner of the bean-entering cover D is provided with a folded region D1 engaged with the edge of the bean-roasting chamber A1. The lower section of the folded region D1 is extended to a blocking board D2 to prevent the roasted bean 8 from being ejected out or squeezed out after entering the chamber A1. The front edge of the body A is provided with a cooling device A00 to rapidly cool the roasted bean 8. Referring to FIGS. 6 and 7, there is shown the cooling of the roasted bean 8. The lower section of the body A is provided with a recessed region A3 having a plurality of recesses A31 for engagement. In order to provide power, the lower section of the recess A3 is provided with a motor A4 having an axle A41 protruded at the recessed region A3. The top of the recessed region A3 is provided with a tray A5 having a central hole for the axle A41 of the motor A4 to pass through. For the tray A5 to be held at the recessed region A3 and at the top of the cooling tray A0, the lower end is provided with a protruded rod A52 and a protruded member A51 to combine with the recess A31. That is the protruded member A51 will be engaged at the recess A31 and the protruded rod A52 will be engaged with the net hole A011. In order to provide a stirring to the roasted bean, the cooling tray A0 is mounted with a cooling rod A02 which is an arch-shaped structure having a center being a squeezed board A022 and having a triggering board A021 at the outer end. The squeezing board A022 is arch-shaped which can stir the roasted bean 8. The inclination angles between the triggering board A021 and the cooling rod A02 is smaller than 90 degree. This allows the roasted bean 8 to be stirred and rapid cooling of the roasted bean 8. Due to the engagement of the net hole A011 with the protruded rod A52 and the engagement of the recess A31 with the protruded member A51, the cooling tray A0 will not move as the motor A4 rotates. As the body A is provided with electronic controller A2 and extended time button H1, switch H2, instant discharge of bean button H3, indicator H4, time selector of bean roasting H5 and control device at the control panel 4. The roasting process can be adjusted into a more precise manner and the quality of the roasted bean is improved.

In accordance with the present invention, the indicator H6 is set into 7 levels and can be selected with the button H5. If extended time is required, button H1 is pressed. To discharge the roasted bean, button H3 is pressed. In order to provide rapid quenching of the roasted bean 8, the chamber A1 is provided with a replaceable residue board A11 and a fan (not shown).

Figure 8:
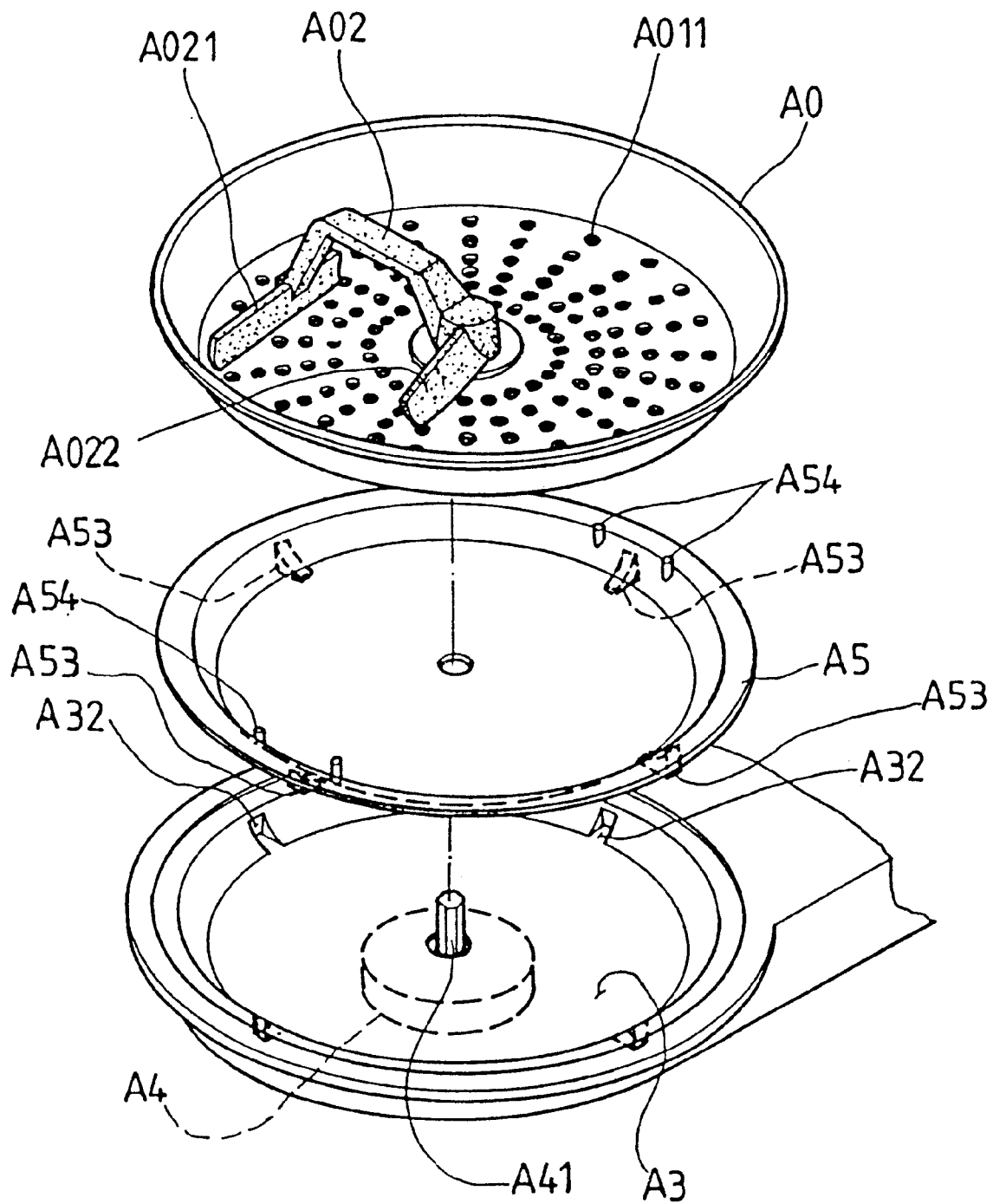
FIG. 8 is a schematic view showing the tray and recess of the cooling device in accordance with the present invention.

Referring to FIG. 8, there is shown the cooling device A00 of another preferred embodiment. The protruded rod A54 is located at the sides to combine with the net hole A011 of the cooling tray A0. The protruded member A51 is a wedge shape block A53 to match with the wedge shape recess A32.

It will be understood that each of the elements described above, or two or more together may also find a useful application in other types of methods differing from the type described above.

While certain novel features of this invention have been shown and described and are pointed out in the annexed claim it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of a roasting device comprising a body, a bean-roasting chamber, bean-entering cover, front frame board, front cover, connecting member, rear cover, fan, filter, fan seat, controller, cooling device, control panel, characterized in that the front section of the bean-roasting device is mounted with the front frame board and the front cover which are detachable, and the connecting member for rotating with fingers are provided to the front frame board and the front cover, the rear section of the roasting chamber are provided in sequence with the fan seat having mounted with a fan and the rear cover with the net holes, a notch is provided between the rear cover and the fan seat, and the filter for fume filtering and particle filtering is positioned within the notch, and the top of the bean-roasting chamber is provided with the bean-entering cover having a downward extending blocking board, and the cooling device is provided with more than one recess at the recess beneath the body, and the tray and the cooling tray are respectively located on the top of the recess, the lower section of the tray is provided with a protruded rod and protruded element for the engagement with the recess of the net hole of the cooling tray, the center of the cooling tray is provided with an arch-shaped cooling rod which is engaged with the axle of the motor, the center of the cooling rod and the external end of the cooling rod are provided with a tapered squeezing board and a triggering board for turning the roasted bean for cooling, the body is provided with electronic controller and electronic controlling device of the control panel.

2. The structure of claim 1, wherein the control panel further comprises time-extending button, switch, instance bean-discharging button, indicator, time option for bean-roasting.

3. The structure of claim 1, wherein the triggering board of the cooling rod and the inclined angle of the cooling rod is less than 90 degree to trigger the bean to enter.

4. The structure of claim 2, wherein the triggering board of the cooling rod and the inclined angle of the cooling rod is less than 90 degree to trigger the bean to enter.

5. The structure of claim 1, wherein the protruded rod and the protruded member at the upper and lower section are symmetrical to match the symmetrical recesses at the recessed region of the net hole of the cooling tray.

6. The structure of claim 1, wherein the protruded rods are located in pair at the lateral sides thereof.

7. The structure of claim 6, wherein the protruded member is a wedge shaped block and the shape of the recesses is identical to the block for matching with the block.

* * * * *